United States Patent [19]
Bowles et al.

[11] Patent Number: 5,251,773
[45] Date of Patent: Oct. 12, 1993

[54] FUEL TANK ASSEMBLY

[75] Inventors: David T. Bowles, Chelmsford; Ronald P. Pardy, Tiptree, both of England

[73] Assignee: Ford Motor Company, Dearborn, Mich.

[21] Appl. No.: 766,536

[22] Filed: Sep. 27, 1991

[30] Foreign Application Priority Data

Sep. 29, 1990 [GB] United Kingdom ............... 9021247

[51] Int. Cl.⁵ ........................................... B65D 25/00
[52] U.S. Cl. .................................. 220/86.2; 220/563
[58] Field of Search ...................... 220/562, 563, 86.2

[56] References Cited

U.S. PATENT DOCUMENTS

| | | | |
|---|---|---|---|
| 2,172,836 | 9/1939 | Elsom | 220/86.2 X |
| 3,643,690 | 2/1972 | Sarai | 220/86.2 X |
| 3,687,335 | 8/1972 | Hunter | 220/86.2 X |
| 3,838,713 | 10/1974 | Tubbs | 220/86.2 X |
| 3,907,153 | 9/1975 | Mutty | 220/86.2 |
| 4,142,647 | 3/1979 | Walters | 220/86.2 X |
| 4,166,550 | 9/1979 | Kleinschmit et al. | 220/86.2 X |
| 4,261,477 | 4/1981 | Casimir et al. | 220/86.2 X |
| 4,700,864 | 10/1987 | Galles et al. | 220/86.2 |
| 4,874,020 | 10/1989 | Bucci | 220/86.2 X |
| 4,974,645 | 12/1990 | Johnson | 220/86.2 X |

FOREIGN PATENT DOCUMENTS

| | | | |
|---|---|---|---|
| 2752645 | 5/1979 | Fed. Rep. of Germany | 220/86.2 |
| 968647 | 9/1964 | United Kingdom . | |
| 1376530 | 12/1974 | United Kingdom . | |

*Primary Examiner*—Steven M. Pollard
*Attorney, Agent, or Firm*—Damian Porcari; Roger L. May

[57] ABSTRACT

The present invention provides a fuel tank having a top surface and a side surface. The side surface has a first aperture and a second aperture below the first aperture. A fuel filler pipe communicates with the second aperture and a sensing tube communicates with the first aperture. An internal communicating means between the first aperture and an ullage point located below the top surface permits the tank to be filled through the filler pipe to a level not exceeding the ullage point.

2 Claims, 2 Drawing Sheets

FUEL TANK ASSEMBLY

FIELD OF THE INVENTION

The present invention relates to a container assembly to regulate fuel levels. More specifically, the invention provides a U-shaped member in motor vehicle fuel tanks to control ullage space.

BACKGROUND OF THE INVENTION

It is desirable that fuel tanks have a residual volume of vapor or air trapped above the fuel in the tank after the tank has been completely filled. The space occupied by a trapped volume of vapor is called the ullage space. One way of achieving an ullage space is for the fuel filler pipe to enter the tank from a side surface rather than the top surface. When the level of fuel in the tank rises above the fuel filler pipe opening, the tank cannot be filled further unless the air or vapor trapped above the fuel filler pipe entrance is allowed to be displaced. Because of constraints on fuel tank shape and placement, it is not always possible to design the fuel filler pipe entrance to coincide with the desired ullage space and it is desirable to fill the tank above the fuel filler pipe entrance. This can be achieved by providing an escape passage which emerges from the top of the tank, which passage is itself closed off by the rising fuel level at a point designed to provide a limit to the level to which fuel can rise in the tank. This passage is referred to as a sensing tube.

Conventionally, the sensing tube comprises three parts, namely, a stub tube projecting into the fuel tank, a stub tube connected into the filler pipe, and a flexible hose connecting the two. Ideally, the open end of the sensing tube, inside the fuel tank, is positioned at a point where, to a substantial extent, the maximum level of fuel is unaffected by the attitude of the tank. In the past, this has led to the sensing tube passing through the top of the tank at its center and the opening of the tube has been located centrally at a given level in the fuel tank so that the fuel level is unaffected by the attitude of the vehicle carrying the tank.

A separately manufactured sensing tube exterior of the tank creates manufacturing as well as packaging difficulties. Top mounted sensing tubes either require greater clearance for the fuel tank or hollow areas on the tank surface to recess the tube. These recesses reduce the overall tank volume. This invention provides a simple way of avoiding entry of the sensing tube into the top of the fuel tank.

SUMMARY OF THE INVENTION

The present invention provides a fuel tank having a top surface and a side surface. The side surface has a first aperture and a second aperture below the first aperture. A fuel filler pipe communicates with the second aperture and a sensing tube communicates with the first aperture. An internal communicating means between the first aperture and an ullage point located below the top surface permits the tank to be filled through the filler pipe to a level not exceeding the ullage point.

More specifically, the invention provides a blow-molded plastic fuel tank having a U-shaped member integrally formed therein. The U-shaped member projects from the top and side surfaces of the tank and communicates between the ullage point and the fuel filler pipe. The U-shaped member is open on its lower surface and sealed against the fuel tank top surface. The legs of the U-shaped member intersect the fuel tank side surface on either side of the first aperture.

Normally, for a fuel tank of symmetrical design, the ullage point will lie at the center of a plane which runs parallel with the top or bottom of the fuel tank. The ullage point lies a distance below the top surface of the fuel tank sufficient to produce the desired ullage space. Desirably, the sensing tube is connected between the fuel tank and an opening in the filler pipe at or near the remote end of the filler pipe.

The base of the internal communicating means preferably lies in a plane hereinafter referred to as the base plane. With the fuel tank horizontally disposed, the base plane may be horizontal. Desirably, however, the base plane is lower at the edge of the tank than it is at the center. Normally, the base of the internal communicating means is open along its length.

In the preferred embodiment of this invention, the internal communicating means is formed by a U-shaped wall. The base of the U-shaped wall is located at the ullage point and the legs of the wall extend from the ullage point towards the side of the tank and diverge as they approach the side of the tank.

If the fuel tank is made of steel, the barrier may be shaped into the top surface or separately manufactured and welded to the underside surface of the top of the fuel tank. If the fuel tank is made of a plastics material, the walls of the barrier may be formed as a depression in the top surface of the tank during the molding of the plastic material. It is an advantage of the present invention that a fuel tank assembly made of plastic material may be molded to incorporate the internal communicating means as an integrally formed member to simplify its manufacture and assembly.

Accordingly, the present invention also provides a one-piece plastic tank assembly having an internal communicating means to provide a controlled ullage space and a means for filling the tank assembly above the fuel filler pipe and sensing tube.

DETAILED DESCRIPTION OF THE PREFERRED EMBODIMENTS

Figure 1:
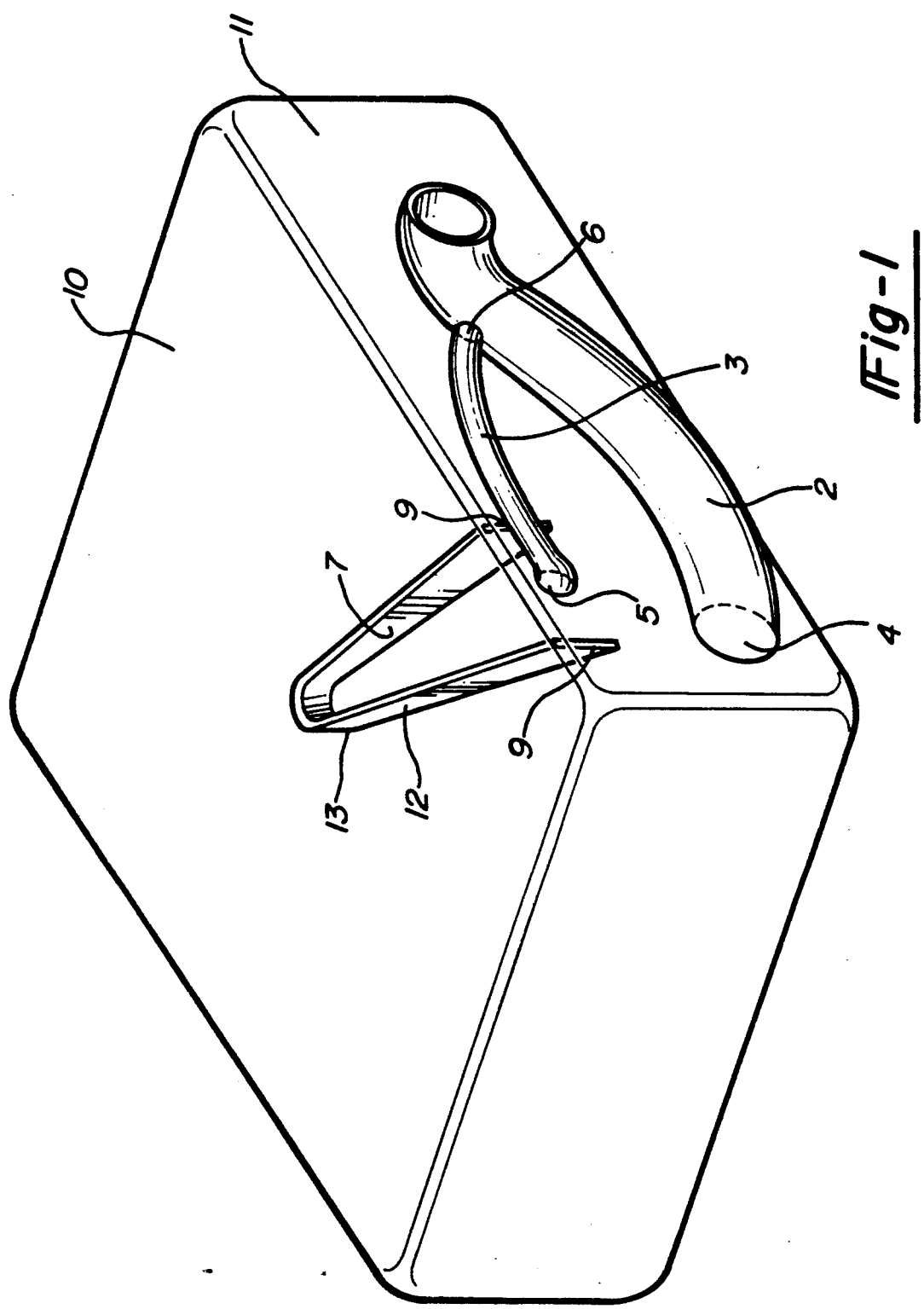
FIG. 1 is a perspective view, partially broken away, of a fuel tank assembly according to the present invention.

Referring to FIG. 1, there is illustrated a fuel tank 1 provided with a fuel filler pipe 2 and a sensing tube 3. The filler pipe 2 opens into the fuel tank 1 at an opening 4. The sensing tube 3 connects with the fuel tank 1 at an opening 5 and with the filler pipe 2 at an opening 6.

Inside the fuel tank 1, is an enclosure 7 which, in plan, is U-shaped. The enclosure 7 extends from a side surface 11 of the fuel tank to the center of the tank.

The enclosure 7 extends from and is integral with the underside of the top surface 10 of the fuel tank 1. The ends 9 of the enclosure 7 are formed integral with the inside of side surface 11 of the fuel tank 1.

The ullage space of tank 1 is defined by the depth and shape of enclosure 7, but, as will be discussed later, is primarily defined by the depth of enclosure 7 at an ullage point 13 at the center of a plane parallel with the bottom and/or top of the tank and located below the fuel tank top surface.

Figure 2:
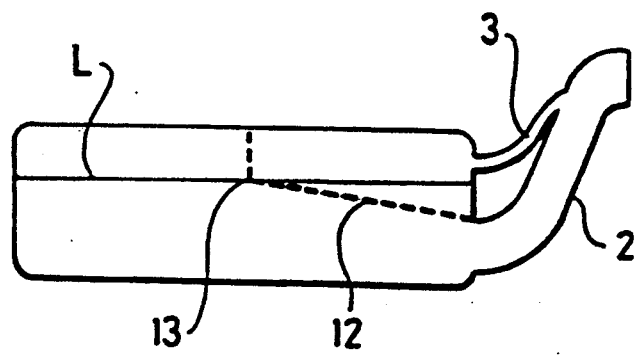
FIG. 2 shows a diagrammatic elevational cross-section of a fuel tank assembly according to the present invention.
Figure 3:
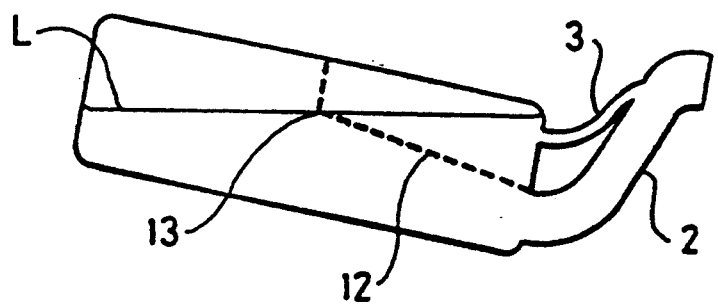
FIG. 3 shows the fuel tank assembly illustrated in FIG. 2 when tilted clockwise.
Figure 4:
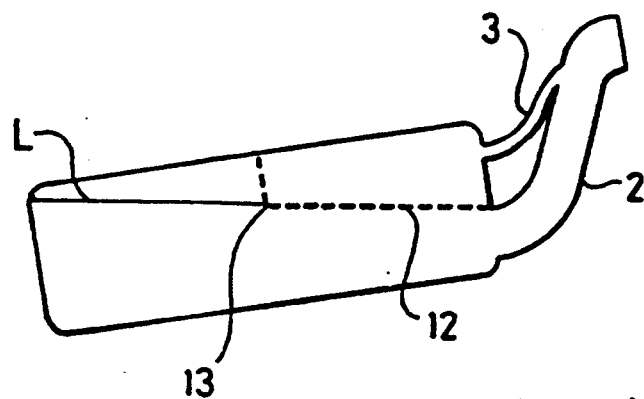
FIG. 4 shows the fuel tank assembly illustrated in FIG. 2 when tilted counter-clockwise.

The essential features of FIG. 1 are also shown on FIGS. 2, 3, and 4, but, additionally these figures illustrate how the design of the enclosure formed by enclosure 7 in the fuel tank regulates the ullage space when the fuel tank is inclined. Referring to FIG. 2, this shows a horizontally disposed fuel tank. The maximum amount of fuel which can be added to the fuel tank through fuel filler pipe 2 is shown by the line marked "L". When the fuel level reaches the ullage point 13, air/vapor trapped in the ullage space cannot be vented. Ullage point 13 is determined by the depth of enclosure 7. As will be appreciated, the flow of fuel into tank 1 will be unrestrained as long as trapped air/vapor inside the tank can be displaced by fuel and escape through sensing tube 3. At the point, however, when the fuel level rises to ullage point 13, it seals the opening at the base of enclosure 7. Vapor within the ullage space cannot be displaced with fuel by venting through the sensing tube 3. Additional fuel added to fuel filler pipe 2 rises to a level sufficient to cut off the flow of fuel from an automatic fuel dispensing pump (not shown). This leaves the fuel in the tank at a maximum level L.

The fuel tank is designed to accept a quantity of fuel even when the tank is being filled on an incline. FIG. 3 illustrates a tank inclined clockwise. Fuel enters fuel filler pipe 2 until it reaches the level L. Level L is a horizontal plane through ullage point 13. Air/vapor above the fuel are prevented from venting through sensing tube 3 by enclosure 7. FIG. 4 illustrates a tank inclined counter-clockwise. Fuel fills the tank to a level L. The lower edge 12 of enclosure 7 should be slightly below fuel level L at the maximum incline a vehicle would expect to encounter while refueling.

The fuel tank assembly illustrated assures a minimum ullage space is maintained when the fuel tank is refueled while on an incline. The fuel rises to a level L and seals lower edge 12 of enclosure 7. Air/vapor above the fuel is prevented from escaping and additional fuel fills the filler pipe and minimum ullage space is maintained when the vehicle is refueled on an incline.

While the invention has been described in terms of a plastic fuel tank having an integrally molded enclosure, changes and modifications may be made to the invention without departing from the spirit and scope of the present invention. The fuel tank and/or enclosure may be made from separate pieces. Additionally, the fuel tank and enclosure may be made of metal and attached to form a fluid-tight seal. The enclosure has been described as U-shaped, but other configurations which communicate between the sensing tube and ullage point are also possible. These as well as other changes and modifications to the preferred embodiments are intended to be included within the scope of the attached claims.

We claim:

1. A blow-molded plastic fuel tank having a top surface and a side surface, and further comprising:
    a first aperture in said side surface;
    a second aperture in said side surface below said first aperture;
    a fuel filler pipe communicating with said second aperture;
    a sensing tube communicating between said first aperture and said filler pipe; and
    a U-shaped enclosure extending downwardly into said tank and formed integral with said top surface, said enclosure having a planar base extending from an ullage point to said side surface at or slightly above said second aperture, whereby said tank may be filled through said filler pipe to a level not exceeding said ullage point.

2. The fuel tank of claim 1, wherein said U-shaped enclosure has two ends formed integral with said side surface, and said first aperture being located between said ends.

* * * * *